Dec. 22, 1959  A. SCHUMANN  2,918,538
ELECTROMECHANICAL TRANSDUCERS
Filed Sept. 20, 1955  3 Sheets-Sheet 1
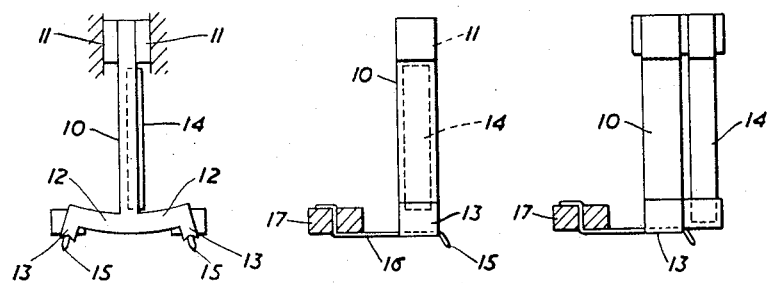
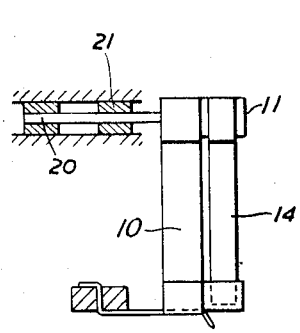
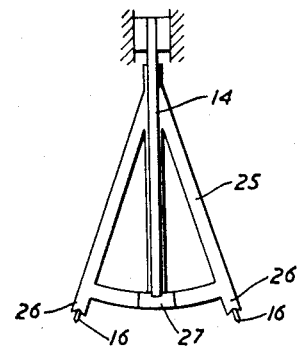

Dec. 22, 1959 A. SCHUMANN 2,918,538
ELECTROMECHANICAL TRANSDUCERS
Filed Sept. 20, 1955 3 Sheets-Sheet 2

Dec. 22, 1959  A. SCHUMANN  2,918,538
ELECTROMECHANICAL TRANSDUCERS

Filed Sept. 20, 1955  3 Sheets-Sheet 3

United States Patent Office 2,918,538
Patented Dec. 22, 1959

2,918,538

ELECTROMECHANICAL TRANSDUCERS

Alec Schumann, Enfield, England, assignor to Cosmocord Limited, Enfield, England, a British company Application September 20, 1955, Serial No. 535,446

Claims priority, application Great Britain September 20, 1954

9 Claims. (Cl. 179—100.41)

This invention relates to electromechanical transducers. The chief application of the invention is to gramophone pickups, and hereinafter will be described in relation to such devices, but the invention can be applied to other devices where similar considerations apply.

The present invention includes an electromechanical transducer comprising a support, a mechanically oscillatable system carried from said support, means for applying both a static mechanical force and an oscil'atory mechanical force to said system, and an electromechanical transducer element and means for transmitting the oscillatory force to said transducer element but not more than a minor proportion of said static force.

The invention also includes an electromechanical transducer comprising a support, a mechanically oscillatable system carried from said support, means for app'ying both a static mechanical force and an oscillatory mechanical force to said system, and a piezoelectric transducer element of the bender type and means for transmitting the oscillatory force to said transducer element but not more than a minor proportion of said static force.

Figure 6:
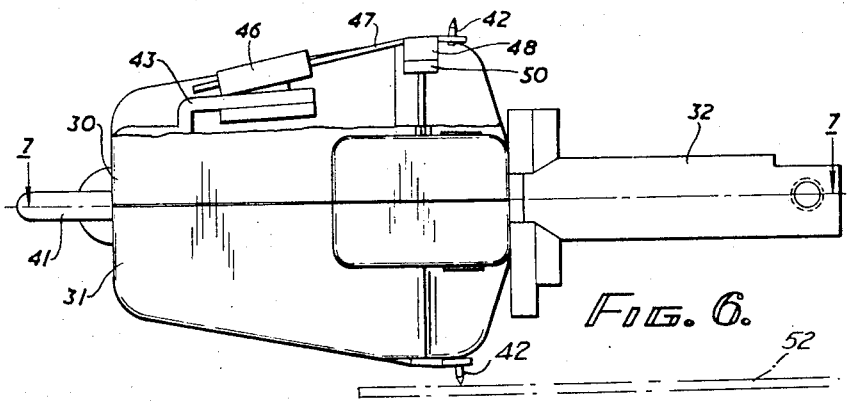
Figure 7:
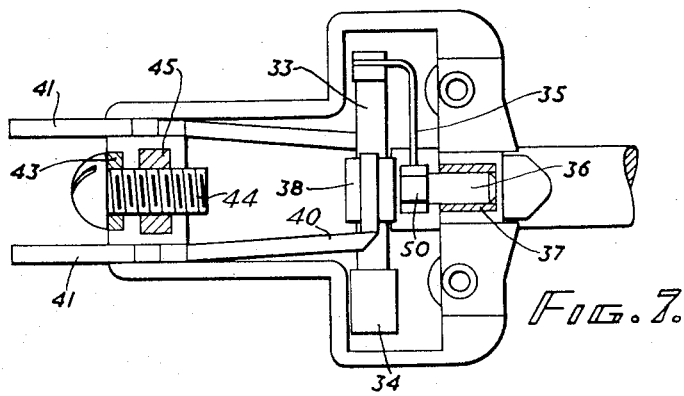
Figure 8:
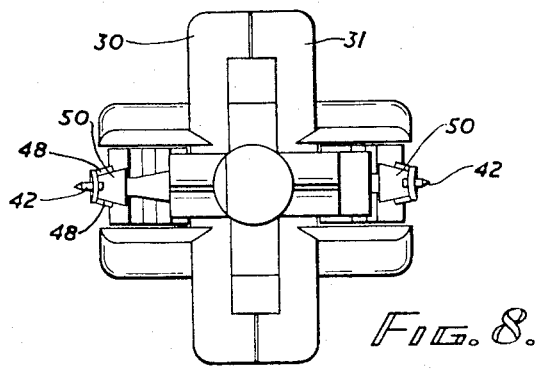
Figure 9:
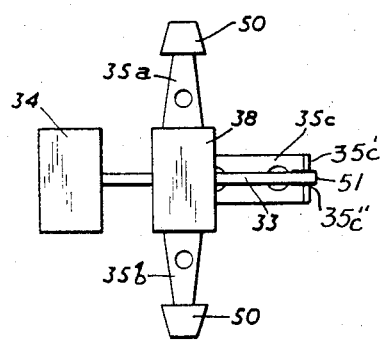
Figure 10:
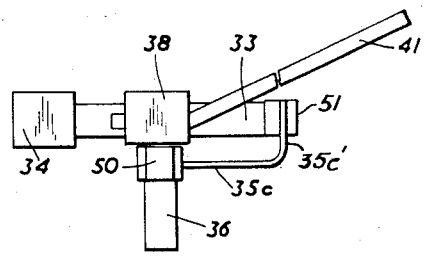

Other features and advantages of the invention will appear from the following description of embodiments thereof, given by way of example, in conjunction with the accompanying drawings in which:

Figure 1 is a diagrammatic front elevation of a gramophone pickup in accordance with the invention, Figure 2 is a side elevation, also diagrammatic, of the pickup of Figure 1, Figure 3 is a side elevation, also diagrammatic, of an alternative form of pickup, Figure 4 is a side elevation, also diagrammatic, of an alternative form of pickup, Figure 5 is a front elevation, also diagrammatic, of an alternative form of support member, Figure 6 is a side elevation of a preferred form of pickup cartridge, Figure 7 is a section, of the same cartridge, on the line 7—7 of Figure 6, with some parts omitted for clarity, Figure 8 is a front view of the cartridge, Figure 9 is a side view of the element and the drive member assembly, and Figure 10 is a view, from underneath of the parts of Figure 9.

In the embodiment of the invention shown in Figures 1 and 2, the transducer element used is of the piezoelectric type, consisting of a strip of piezoelectric material such as barium titanate; the element is of the bimorph "bender" type. The moving system of the pickup comprises a support member 10 formed of a resilient material such as metal, or preferably an insulating synthetic material such as polystyrene. This member has a portion of generally strip-like form, which can be identified as the shank, and at one end, which will be defined as the upper end, the member is clamped to the casing 11 of the pickup. The shank of the member is approximately vertical. The flexibility of the polystyrene is sufficient to permit the member to move as though the shank were pivoted about a horizontal axis near the clamped area, and lying in the plane of the strip of the shank and approximately tangential to the record groove.

At the lower end of the shank of the support member are two transverse extensions, one at each side, so that the shank and the extensions give the appearance of an inverted T, though the extensions can be arcuate in shape, centered approximately about the pivot axis of the member. From the end of each extension is a small depending projection 13, the bottom of which is notched.

The transducer element 14 is associated with the element so that movement of the element about its effective pivot induces stress in the transducer, and thereby a corresponding voltage upon the electrodes upon it. In the present embodiment the transducer member is partly or completely embedded in the polystyrene of the shank.

Two styli 15 of different tip radii are used, so that the pickup can be used with records made to the different standards now in use. Each stylus is carried on the turned-down end of a horizontal carrier 16 the other end of which is mounted in a resilient pad or the like 17 in the casing. Each stylus carrier lies approximately tangential to the record groove and rests in one of the notches in the extensions of the support member, and one or other of the styli can be brought into operation by rocking the assembly in the casing, or preferably the casing as a whole, to bring one of the styli lower in position than the other.

With the arrangement described, it will be seen that when one of the styli is in use there will be imparted to it, and hence to the moving system, both a static force and an oscillatory force. The former is the force due to the weight of the pickup, or such part of that weight as is permitted by counter-balance weights, springs or the like to be applied to the stylus, and the latter is the motion due to the record groove. The static force may or may not be without variations, but any such variations will be of much lower frequency than the desired oscillations; the static force is to be considered as including any such variations.

In the construction shown in Figures 1 and 2 the static force is transmitted to the moving system and to the casing, but is negligibly transmitted to the element 14. On the other hand, the oscillatory force is applied to the element so that a desired electrical output is obtained from it.

In a mod fied form of this embodiment of the invention, shown in Figure 3, a support system is used which is generally similar, but the transducer element 14 is mounted with respect to it so that it lies parallel to, forwardly of and approximately in the same plane as the shank of the support member. The upper end of the element is clamped, conveniently by an extension of the same clamp as that used for the support member, and the lower end of the transducer element is embedded endwise in a forwardly projecting lug 17 on the bottom centre part of the shank.

Where the transducer element is spaced from the shank of the support member, as in the embodiment of Figure 3, it is also possible to mount the upper end of the support member by means of an extension or insert acting as a true pivot, while the transducer element is independently clamped, and an arrangement of this kind is shown in Figure 4. In the embodiment of Figure 4, the upper part of the shank 10, instead of being clamped to the casing at 11, is mounted by a pivot shaft 20; this pivot can be formed integrally with the shank or can be moulded or inserted in it. The pivot is carried by two resi'ient bearing and damping bushes 21, lodged in a suitable recess in casing 11.

Figure 5 shows an alternative form of the invention, in which the support member 25 is given an approximately triangular form. The stylus carriers 16 are coupled as before to notches on projections 26 at the lower angles of the triangle; the triangle is pivoted as in Figure 4 or clamped as in Figure 1 near its apex, and the transducer element 14 is clamped at its upper end adjacent the apex of the triangle and is coupled at its lower end to a forward projection 27 on the middle of the base of the triangle.

A preferred form of the invention is shown in Figures 6 to 10 of the drawings. The cartridge shown in these drawings includes a two-part moulded casing 30, 31 which at the front end has secured to it a mounting pivot 32; this is carried in a suitable bearing about a horizontal axis, so that the cartridge can pivot through 180° for example in the manner shown in United States application Serial No. 332,177, filed January 21, 1953, in the name of Stanley Kelly and British Patent No. 760,787.

An elongated barium titanate bender type piezoelectric element 33 is restrained at its one end in a block 34 of a compliant and, it may be, an appreciably lossy material held in a suitable recess in the casing. The element is adapted to be driven at its opposite end by means of a generally planar drive member 35 of T-shape which includes a pivot 36 lodged in a recess in the rear face of the pivot 32, whereby the planar T-shaped drive member is enabled to move pivotally in its own plane, a sleeve 37 of bearing material being interposed. The drive member 35, as shown more clearly in Figure 9, has two arms 35a and 35b which are in line and extend in opposite directions from the axis of pivot 36, and a third arm 35c at right angles to the two other arms 35a, 35b, all the arms lying substantially in one plane. The end portion 35c' of arm 35c is bent at right angles and is slotted at 35c'' to receive the end of element 33, which is secured firmly in the slot by cement. A thickness of paper 51 can be interposed between each side of the element 33 and the corresponding edge of the slot 35c''. The third arm 35c thus serves as a mechanical coupling from drive member 35 to element 33 near the outer end of the latter.

The central part of the element 33 is located in a slot in a block 38 of compliant lossy material, one function of which is to induce the element to vibrate in the desired mode. Electrodes 40 are provided on the element, and these are connected to terminals 41.

The element can be driven alternatively by two styli 42; but for the radius of the tip of the two styli the two driving systems are the same, and one only will be described. A shaped support 43 is held in the casing by a screw 44 and trapped nut 45, and in a hole at each end of the support is fixed a grommet or plug 46 of compliant lossy material. A flat stylus carrier 47 is held frictionally in a slot in the plug 46, the carrier having at its forward end adjacent stylus 42 two inwardly turned lugs 48. These two lugs embrace a small block 50 of compliant material which is cemented or held frictionally on the end of the arm 35a (or 35b) of the drive member thus coupling each stylus 42 to its arm 35a, 35b of the drive member.

In use, the stylus oscillating in the transversely recorded groove of the record disk 52 oscillates the carrier and in turn drives the drive member. Because of the manner of its mounting the drive member can move with what is substantially a pure pivotal movement. In turn a substantially pure bending force is applied to the piezoelectric element. It will be seen also that since the supporting system couples the oscillatory but not the static force to the element, in the event of excessive force or shock being applied to one of the styli, for example due to the cartridge being accidentally dropped onto a record, the shock is borne mainly by the pivot 36 and only to a small extent by the element. Moreover, by making the drive member 35 planar, it can be constructed from very thin and hence light weight sheet stock and hence will have a low moment of inertia. Furthermore, the construction enables the pivotal axis of the drive member to be disposed intermediate the ends of the elongated piezoelectric element as shown in Figs. 7, 9 and 10 and hence makes possible a most compact construction.

The response of the pickup will be affected materially by the nature of the materials used for blocks 34, 38 and 50, sleeve 37 and plugs 46; these can be predominantly compliant, or can have a substantial frictional loss as desired. Suitable materials are described in United States application Serial No. 332,177 filed January 21, 1953, in the name of Stanley Kelly and British Patent No. 760,-787. The advantage of a lossy material for plugs 46 is referred to in United States application Serial No. 551,-952 filed December 8, 1955, in the names of John Nelson Adams and John Watson Brownlee.

With the various embodiments described the support member is mounted so that it can follow the vibrations imparted to it by the stylus in use, and in doing so it effectively pivots about the axis referred to. This may be a true pivotal movement or it may be the equivalent where the support member flexes. The bender element will likewise have an effective axis about which it pivots, and it can be arranged that the two axes of movement of the support and the element are colinear or the same or at different distances from the stylus in use. This last, in conjunction with the feature of varying the point at which the support is coupled to the element makes it possible to vary the mechanical leverage between the two parts, and hence to modify the mechanical impedances presented by two styli.

The invention, while described in conjunction with transducers of the piezoelectric type, can be used also with transducers of other types including electromagnetic types.

I claim:

1. An electromechanical transducer comprising a casing, an elongated piezoelectric bender element secured near one end thereof with respect to said casing and a drive system for imparting oscillatory movement to said piezoelectric element at a point near the other end thereof, said drive system including a drive member of generally planar form and mounted in said casing for pivotal movement substantially in its own plane and about an axis approximately at right angles to the said plane, said drive member including first and second arms extending from the region of said axis at different angular positions in said plane, first coupling means for coupling a first stylus to said first arm and second coupling means for coupling a second stylus to said second arm, and a mechanical coupling from said drive member to the point near the said other end of said piezoelectric element.

2. An electromechanical transducer in accordance with claim 1 wherein said mechanical coupling comprises a third arm on said drive member extending from the region of said axis.

3. An electromechanical transducer in accordance with claim 2 and wherein the plane of said drive member is approximately parallel to the length of said piezoelectric element and said third arm comprises a portion disposed at approximately right angles to the said plane, said portion being coupled to said piezoelectric element.

4. An electromechanical transducer as defined in claim 1 wherein said drive member is T-shaped, said first and second stylii are coupled to the outer ends of the arms of the T, the end of the stem of the T is coupled to one end of said piezoelectric element, said pivotal axis of rotation of said drive member is disposed at the junction of the arms and stem of the T, and said piezoelectric element extends longitudinally of the stem in the direction of and beyond the arms of the T.

5. A gramophone pickup cartridge comprising a cartridge adapted for connection to a pickup arm, for reproducing from a transversely recorded groove in a record disk, said cartridge comprising a casing, an elongated piezoelectric bender element secured near one end thereof with respect to said casing, with the length of said piezoelectric element substantially parallel to the plane of said disk, and a drive system for imparting oscillatory movement to said piezoelectric element at a point near the other end thereof, said drive system including a drive member of generally planar form and mounted in said casing for pivotal movement substantially in its own plane and about an axis approximately at right angles to the said plane, said axis being substantially radial of said disk, said drive member including first and second arms extending from the region of said axis at different angular positions in its own plane, first coupling means for coupling a first stylus to said first arm and second coupling means for coupling a second stylus to said second arm, and a mechanical coupling from said drive member to the point near the said other end of said piezoelectric element.

6. A gramophone pickup cartridge in accordance with claim 5, wherein said first and second arms extend from said axis in substantially opposite directions.

7. A gramophone pickup cartridge in accordance with claim 5, wherein said mechanical coupling comprises a third arm on said drive member extending from the region of said axis.

8. A gramophone pickup cartridge in accordance with claim 7, and wherein the plane of said drive member is approximately parallel to the length of said piezoelectric element and said third arm comprises a portion disposed approximately at right angles to the said plane, said portion being coupled to said piezoelectric element.

9. A gramophone pickup cartridge as defined in claim 5 wherein said drive member is T-shaped, said first and second stylii are coupled to the outer ends of the arms of the T, the end of the stem of the T is coupled to one end of said piezoelectric element, said pivotal axis of rotation of said drive member is disposed at the junction of the arms and stem of the T, and said piezoelectric element extends longitudinally of the stem in the direction of and beyond the arms of the T.

References Cited in the file of this patent

UNITED STATES PATENTS

| | | |
|---|---|---|
| 1,977,433 | Dunning | Oct. 16, 1934 |
| 2,160,793 | Dally | May 3, 1939 |
| 2,326,280 | Bauer | Aug. 10, 1943 |
| 2,668,196 | Bauer | Feb. 2, 1954 |
| 2,670,407 | Martin | Feb. 23, 1954 |
| 2,701,280 | Chamberlain | Feb. 1, 1955 |
| 2,717,929 | Klingener | Sept. 13, 1955 |

FOREIGN PATENTS

| | | |
|---|---|---|
| 158,364 | Australia | Aug. 20, 1954 |